US008781118B1

(12) United States Patent
Pedersen

(10) Patent No.: US 8,781,118 B1
(45) Date of Patent: Jul. 15, 2014

(54) DIGITAL FINGERPRINTS FOR INTEGRATED CIRCUITS

(75) Inventor: Bruce B. Pedersen, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 1320 days.

(21) Appl. No.: 12/269,013

(22) Filed: Nov. 11, 2008

(51) Int. Cl.
*H04L 9/00* (2006.01)

(52) U.S. Cl.
USPC ............................................. 380/46; 380/44

(58) Field of Classification Search
USPC ............................................................ 380/46
See application file for complete search history.

(56) References Cited

U.S. PATENT DOCUMENTS

| 7,702,927 B2 * | 4/2010 | Devadas et al. ............... 713/194 |
| 2007/0288765 A1 * | 12/2007 | Kean .............................. 713/193 |
| 2008/0279373 A1 * | 11/2008 | Erhart et al. ..................... 380/46 |
| 2009/0276844 A1 * | 11/2009 | Gehrmann et al. ............. 726/16 |

* cited by examiner

*Primary Examiner* — Edward Zee
*Assistant Examiner* — Baotran N To
(74) *Attorney, Agent, or Firm* — Womble Carlyle Sandridge & Rice LLP

(57) ABSTRACT

Circuits and methods for verifying the unique identity, or digital fingerprint, of an integrated circuit (IC) are presented. The complete circuit is located inside the IC to avoid external tampering and includes a random number generator (RNG), a key register, an encryption circuit, and selection circuitry. The key register stores an encryption key generated by the RNG during the initialization phase. The encryption key can be read from the outside of the IC solely during the initialization phase. After the initialization phase, the encryption circuit generates a response to a challenge using the encryption key, and the selection circuitry outputs in a pin of the IC the response to the challenge. The response is used to check the unique ID of the IC. The encryption key is never sent to the outside of the IC after initialization, and mimicking the behavior of the IC by an impostor is avoided by the use of the encryption mechanism.

21 Claims, 5 Drawing Sheets

DIGITAL FINGERPRINTS FOR INTEGRATED CIRCUITS

CROSS REFERENCE TO RELATED APPLICATIONS

This application is related to U.S. patent application Ser. No. 12/262,666, and entitled "Hardware True Random Number Generator in Integrated Circuit with Tamper Detection" which is incorporated herein by reference.

BACKGROUND

The present invention relates to circuits and methods for uniquely identifying an integrated circuit, and more specifically, circuits and methods for giving integrated circuits a unique fingerprint that cannot be duplicated.

Implementing secure applications in certain devices requires that the devices be uniquely identified, and that cannot be cloned. Examples of such devices include software-defined radios, cellular handsets, military radios, etc. For example, a military radio may have to be selectively disabled if the radio was captured or stolen. Additionally, it is desirable to prevent a lost or stolen handset or radio from being reconfigured to clone an existing handset radio.

A programmable integrated circuit typically consists of a core array of programmable logic elements, each of which may have one or more inputs and outputs that can be programmed to output a Boolean function of one or more of the inputs. The inputs and outputs of these logic elements can be connected to each other using programmable routing connections. Typically, the programmable logic elements and programmable routing connections are controlled by configuration elements—such as volatile or non-volatile configuration bits. Volatile configuration elements are typically loaded by an external bit-stream that is presented to the device during the configuration time following a power-on-reset event or a reconfiguration signal event. For secure applications, this bit stream is often in encrypted form and then decrypted by a decryption unit inside the integrated circuit, such as an Advanced Encryption Standard (AES) encryption/decryption engine.

Designs implemented in programmable devices have the disadvantage of being cloneable. That is, an application using one programmable device can be configured to act identically to an application programmed into another programmable device. This is particularly undesirable when the IC needs to be uniquely identified.

Some solutions are based on non-volatile fuses in the IC that can be programmed with a unique ID. However, even if the ID were programmed at the factory, devices prior to the fuse programming are susceptible to theft. Such un-programmed devices could later be programmed to clone a programmable device by reading the unique ID and then programming the fuses in the clone device. In addition, the security cost for protecting the world-wide manufacturing process in such a scenario is incompatible with a desire for low-cost devices.

It is in this context that embodiments of the invention arise.

SUMMARY

Embodiments of the present invention provide circuits and methods for verifying the unique identity, or digital fingerprint, of an integrated circuit (IC). The digital fingerprint is unique for each IC and can not be duplicated.

It should be appreciated that the present invention can be implemented in numerous ways, such as a process, an apparatus, a system, a device or a method on a computer readable medium. Several inventive embodiments of the present invention are described below.

In one embodiment, a circuit for verifying the unique identity of an integrated circuit (IC) is presented. The complete circuit, located inside the IC to avoid external tampering, includes a random number generator (RNG), a key register, an encryption circuit, and selection circuitry. The key register stores an encryption key generated by the RNG during an initialization phase. The encryption key can be read from the outside of the IC solely during the initialization phase. After the initialization phase, the encryption circuit generates a response to a challenge using the encryption key, and the selection circuitry outputs the response to the challenge. The encryption key is never sent to the outside of the IC after initialization, and mimicking the behavior of the IC by an impostor is avoided by the use of the encryption mechanism.

In another embodiment, a method is presented that implements the operations performed by the previously described circuit.

In yet another embodiment, a circuit for verifying a unique identity of an integrated circuit (IC) is presented. The circuit includes a random number generator (RNG), an ID (identification) register, and a dedicated input/output (I/O) pin. The ID register stores the IC ID, where the IC ID is loaded from the RNG circuit during an initialization phase. The dedicated input/output (I/O) pin outputs the content of the ID register, where the I/O pin is the only way to access the content of the ID register, and the I/O pin is not accessible to other elements of the IC besides the ID register.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe circuits and method for verifying the unique identity, or digital fingerprint, of an IC.

It will be obvious, however, to one skilled in the art, that the present invention may be practiced without some or all of these specific details. In other instances, well known process operations have not been described in detail in order not to unnecessarily obscure the present invention.

An integrated circuit can be given a unique identity by loading a unique pattern of bits into a battery-backed volatile register or into non-volatile fuses, among other volatile and non-volatile storage elements. In order to avoid duplication of this bit pattern by third parties, the bit pattern is transformed by an encryption device on the IC before being programmed into the volatile or non-volatile storage elements. This way, even if the unique ID on the device were discovered, it would still be difficult to program a similar IC with the same ID without knowing the original encryption key. While making cloning difficult, this method does not make it impossible because a persistent cryptographic attack might find a way to duplicate the key.

Another way of giving an IC a unique ID is by programming the ID into each IC using one-time-programmable fuses at the time of manufacturing or testing of the IC. However, this approach does not guarantee a unique ID since a persistent adversary might be able to steal a device from the manufacturing chain prior to the fuse-programming, giving the adversary a cache of devices with which to clone any other device. It would also be difficult to guarantee that the manufacturing process itself did not mistakenly release ICs that were not programmed, or which had duplicate IDs. In addition, the heavy cost involved in securely shipping the devices across the world after manufacturing would be incompatible with the manufacturing of low-cost commercial ICs.

Figure 1:
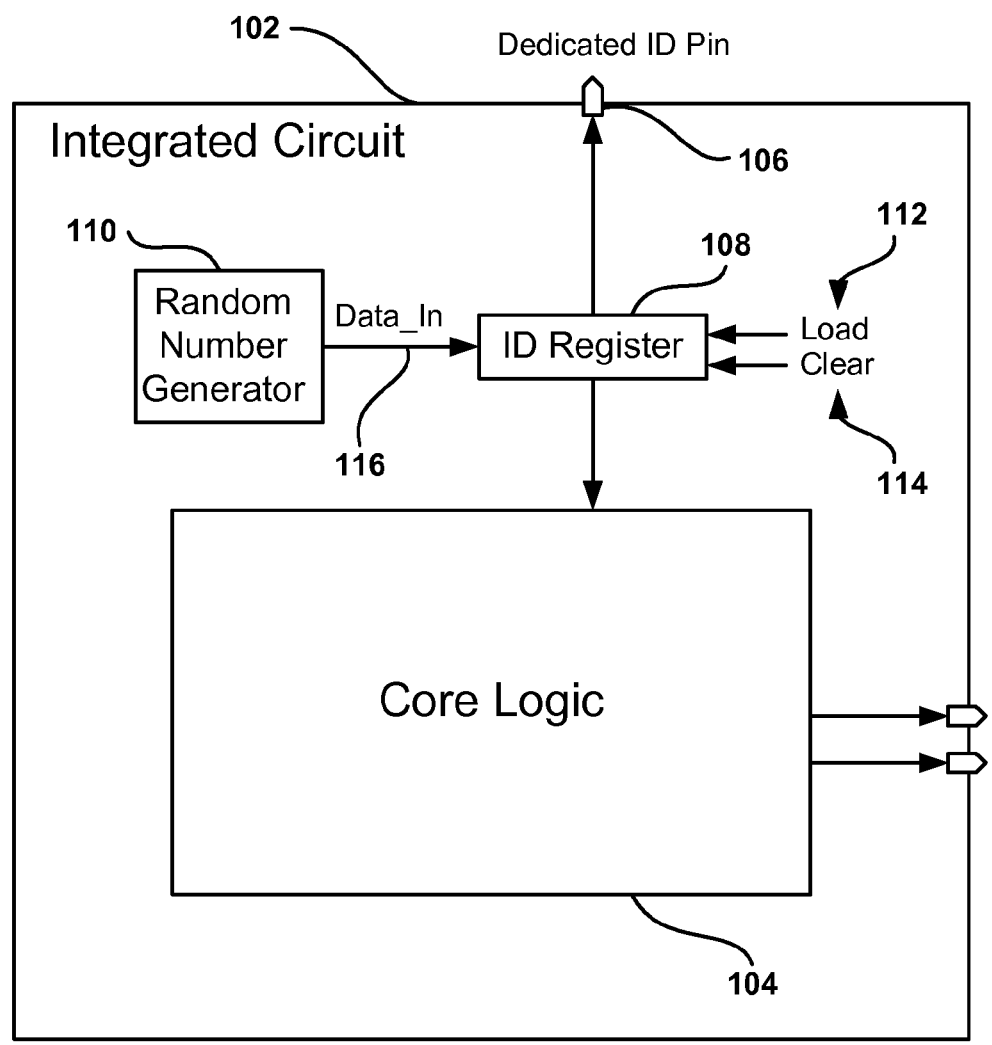
FIG. 1 shows a circuit for verifying the unique identity of an integrated circuit, according to one embodiment.

FIG. 1 shows a circuit for verifying the unique identity of an integrated circuit, according to one embodiment. IC 102 contains Random Number Generator (RNG) 110 feeding ID register 108. ID register 108 is cleared when input 114 signals the ID register to clear its content. When input 112 is activated, the ID register is loaded with a data pattern generated by RNG 110 and transmitted via data line Data_In 116. The ID register is accessed through dedicated pin 106 that cannot be programmable driven by core logic 104. In another embodiment, a plurality of dedicated pins, not accessible by the core, are used to output the content of ID register 108.

ID register 108 can be a volatile memory (possibly backed up by a battery) or non-volatile memory, such as a polyfuse register. ID register 108 can be loaded by, and only by, RNG 110. The random number generator can be implemented using an amplified thermal noise source that is filtered and digitized to produce a non-biased stream of 0's and 1's, such as the one described below with respect to FIG. 3. In other embodiments, other RNGs can be used as long as they are implemented inside IC 102 and produce random numbers that can not be reproduced or predicted.

There is no user write-access to ID register 108, either externally or internally, to the IC. ID register 108 can only be changed by "clearing" the ID register or by "reloading" the ID register from RNG 110. ID register 108 is loaded from RNG 110 by an initialization event during the initialization phase. This initialization event can be triggered by the first power-on-reset encountered by the device, or can be triggered by a user-applied signal. The initialization event causes ID register 108 to store the random ID received from RN 110.

In one embodiment, ID register 108 is read by a design implemented in the IC fabric. In another embodiment, ID register 108 is read by an external entity through dedicated JTAG pins, or through other pins dedicated to accessing ID register 108. Accessing ID register 108 through dedicated pins, such as JTAG (Joint Test Action Group) pins that can not be configured by the core to output an arbitrary ID value, allows the IC to be uniquely identified by the ID in a way that can not be cloned or faked by a different IC. If the ID were accessed though a general-purpose programmable pin, then an adversary could program the IC to output the same ID value, making the solution less resistant to malicious attacks. The IC device cannot be cloned using a similar IC because a potential attacker does not have control over the ID that is read from ID register 108 through the dedicated pins, such as pin 106.

However, an adversary could read the ID and, with sufficient resources, manufacture a counterfeit IC that would function as a cloned IC by outputting the read ID on what appears to be dedicated pins. An adversary could also attack the design at the system level by remapping board traces so a component checking the output of the dedicated pins would no longer be fed by the dedicated pins, but instead by a digital source that mimicked the ID of the true FPGA.

Figure 2:
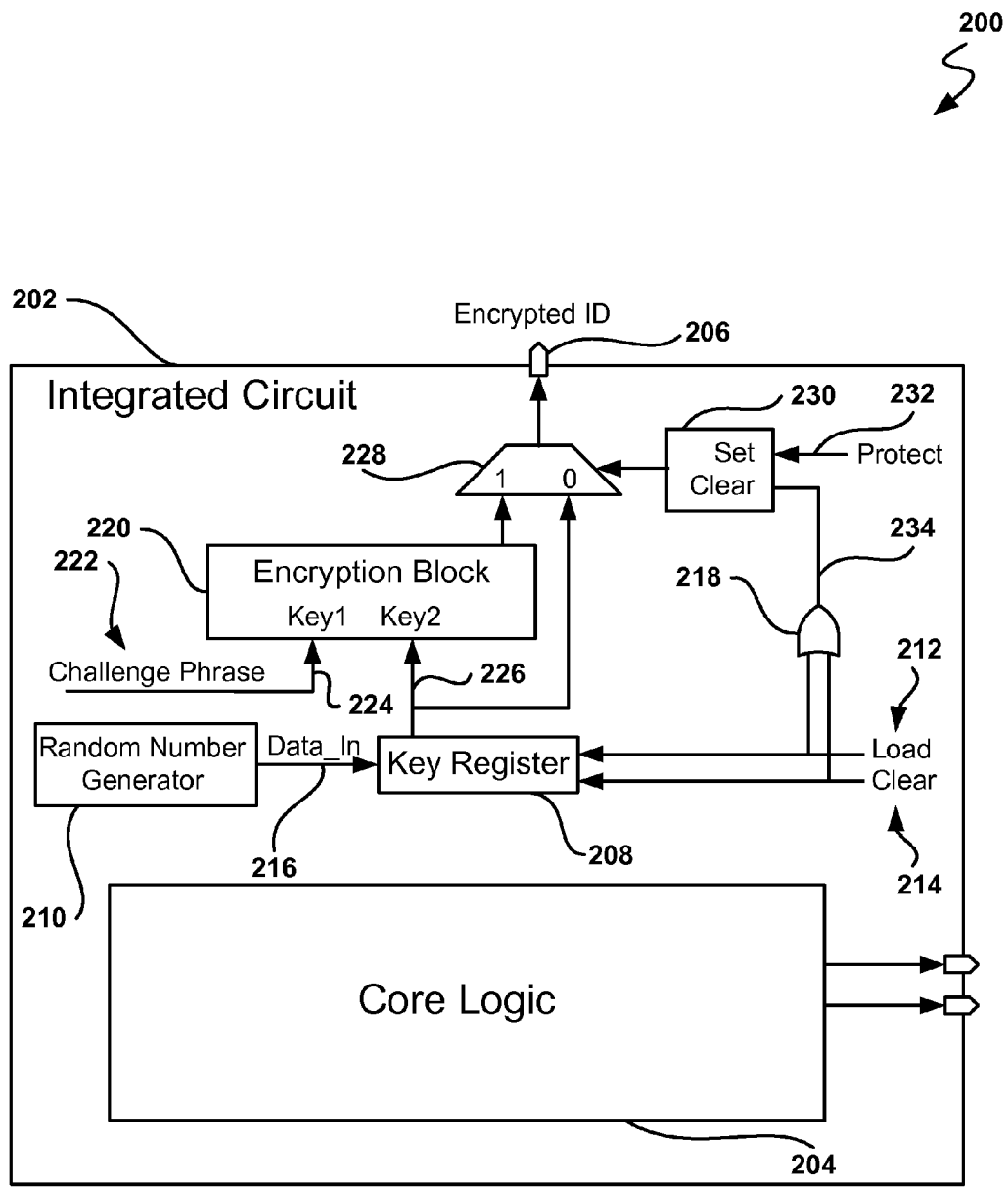
FIG. 2 shows a circuit for verifying the unique identity of an integrated circuit based on a random encryption key, according to one embodiment.

FIG. 2 shows circuit 200 for verifying the unique identity of integrated circuit 202 based on a random encryption key, according to one embodiment. In circuit 200, the contents of Key register 208 may be read until a protect bit 230 is set by protect input 232. After bit 230 is set, Key register 208 may only be read through an encryption block 220, using the key in Key register 208 and user-supplied challenge phrase 222 as the input keys to encryption unit 220. Protect bit 232 may only be cleared after Key register 208 is cleared or loaded in one embodiment. In another embodiment, Key register 208 is a register with 128 bits, but other values, such as 256 bits, are also possible.

Key register 208 can not be directly read under normal operation, neither by the core IC fabric 204 nor through any of the input/output (I/O) pins of IC 202. Instead, Key register 208 stores a key used by encryption block 220. IC 202 is uniquely identified by processing supplied challenge phrase 222 by encryption block 220 using the hidden key in Key register 208 as the encryption key. The challenge phrase will typically be an arbitrary random number and can be externally supplied, or supplied internally by core logic 204.

In one embodiment, the key value is initially read by an external entity via multiplexer 228 and encrypted ID pin 206. A one-time-programmable security-bit 230 is then set by the user to disable direct access to the key, thereby allowing the ID of IC 202 to be checked only indirectly via encryption block 220. In one embodiment, security bit 230 cannot be cleared once set. In another embodiment, security bit 230 can be cleared but only after clearing Key register 208 and reloading a new key from RNG 210 via Data_In connection 216.

This circuit allows the user to directly access the key before security bit 230 is set, but prevents anyone else from reading the key once security bit 230 is set. A user in possession of the key can uniquely identify IC 202 by presenting random challenge phrase 222 to the IC and reading back the encrypted response from the encrypted ID pin 206. By knowing the true ID (which is hidden from others by the security bit), the challenge-phrase, and the encryption algorithm, the user can compute the expected response and compare the expected response with the response from IC 202. An attacker without possession of the original key would not be able to generate the correct encrypted result even if the attacker had access to the challenge phrase and the encryption algorithm.

Inputs Load 212 and Clear 214 are connected to Key register 208 to direct Key register 208 to load a new value from RNG 210, or to clear the content of Key register 208, respectively. Logical OR gate 218 has inputs Load 212 and Clear 214, and generates a logic value of high when either of the inputs are logic high. Output 234 of logical OR gate 218 is connected to the memory holding security bit 230 to clear security bit 230. Once security bit 230 is cleared, multiplexer 228 enables the reading of Key register 208 via connection 226 and encrypted ID pin 206, after Key register 208 has been cleared or re-loaded.

In one embodiment, the IC is a programmable logic device, such as an FPGA containing an encryption engine implementing Advanced Encryption Standard (AES) encryption. This reduces the incremental cost of implementing the random ID-key feature in the FPGA hardware by using the existing AES encryption engine when needed to identify IC 202. The output of RNG 210 is available to core 204 of the FPGA, but this access by core 204 is disabled when RNG 210 is generating bits for Key register 208.

As a result, IC 202 has a unique digital fingerprint that cannot be copied or cloned. The large size (128 bits in one embodiment) of the Key register prevents two IC from accidentally receiving the same random ID. This unique ID allows a system containing the IC to be uniquely identified, and enablement or disablement of the device holding the IC as required.

It should be appreciated that the embodiments illustrated in FIGS. 3 and 4 below are exemplary circuits implemented in the IC for generating true random numbers. Other embodiments may utilize different random generating circuits. The embodiments illustrated in FIGS. 3 and 4 should therefore not be interpreted to be exclusive or limiting, but rather exemplary or illustrative.

Figure 3:
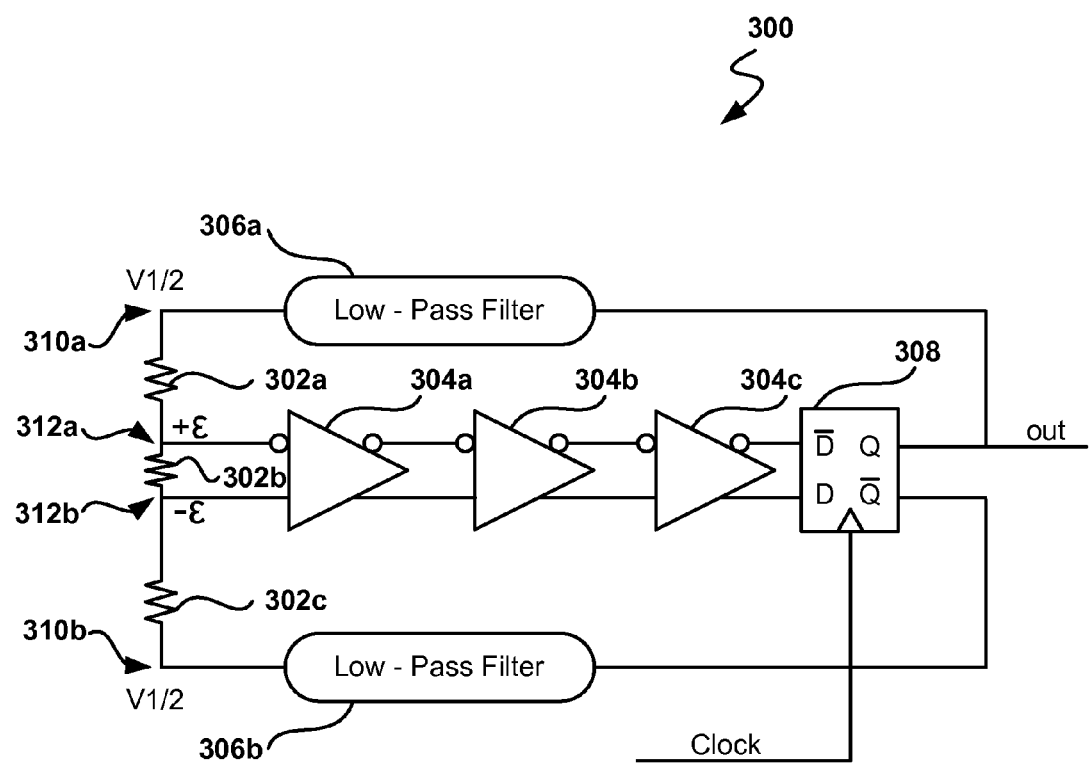
FIG. 3 depicts an embodiment for a TRNG circuit based on shot-noise across a resistor.

FIG. 3 depicts an embodiment for a TRNG circuit 300 based on shot-noise across a resistor 302b. Shot noise is a type of electronic noise that occurs when the finite number of particles that carry energy, such as electrons in an electronic circuit, is small enough to give rise to detectable statistical fluctuations in a measurement. Shot-noise across resistor 302b is differentially amplified and then digitized to output a logic value of 0 or 1. In one embodiment, the amplification of the voltage across resistor 302b is accomplished by three differential amplifiers 304a-c. While three amplifiers are shown in FIG. 3, any other number of amplifiers is possible in other embodiments, as long as the noise signal is subject to enough amplification to generate 0's and 1's at latch register 308.

The output of differential amplifier 304c is digitally latched by a clock signal in latch register 308. The Q output of latched register 308 is passed through low pass filter 306a, and then fed back negatively to differential amplifier 302a. The $\overline{Q}$ output of latch 308 is fed via low pass filter 306b to another terminal of differential amplifier 304a. The amplification and the filtering are balanced in order to output an approximately equal number of 0's and 1's. It should be appreciated that the Q output of latch 308 is the output of TRNG circuit 300.

The filtering frequency of low-pass filters 306a-b is much smaller than the clock frequency in order to generate a voltage V½ which is about one half the value corresponding to a high voltage generated by latch 308. The latch generates about an equal number of 0's and 1's to force voltages V½ 310 a-b over time to stay at a level corresponding to one half of a logic high voltage. This is accomplished by feeding negatively Q and $\overline{Q}$ to differential amplifier 304a. Once the circuit is balanced, the voltage across terminals 312a-b of resistor 302b corresponds to small noise variations, which are amplified to generate the random number.

Figure 4:
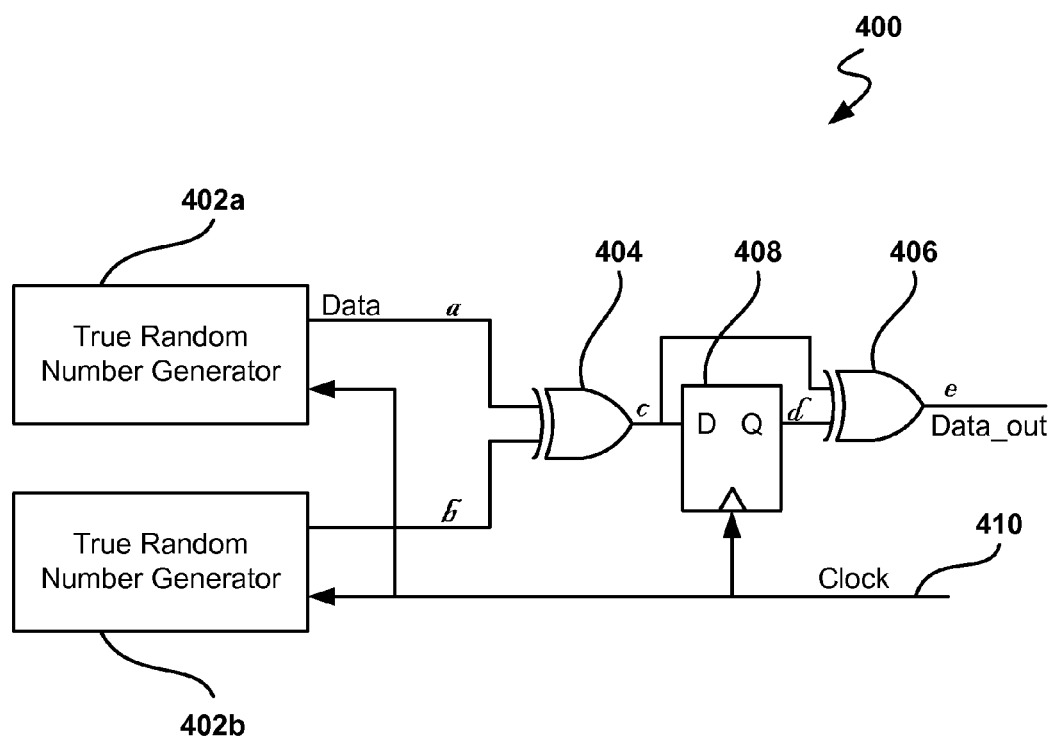
FIG. 4 illustrates a circuit combining the outputs of two identical TRNGs to generate a TRNG with tamper detection.

FIG. 4 illustrates a circuit combining the outputs of two identical TRNGs to generate a TRNG with tamper detection. Even though a balanced differential amplifier, such as the one in FIG. 3 including amplifiers 304a-c, is used to generate random numbers, it may still be possible for the random output of the amplifier to become temporarily non-random if the power to the amplifier is subjected to sudden changes in voltage, or if the device is subjected to sudden temperature changes. To detect if the TRNG becomes non-random, one embodiment uses a pair of identical random-number generators 402a-b located proximate to each other on the die and tied to the same power busses. Because random noise sources 402a-b are paired, an outside affect (such as a power surge) that affects one random number generator will likely affect the other as well. Thus, if the output of one random number generator is temporarily forced to a "0" (or to a "1"), the other random number generator will likely also be forced to a "0" (or to a "1"), respectively.

In one embodiment, both random number generators are sampled at the same time, and the output of the random generators is used if the sequence of bits appears to be relatively random. In one embodiment, the random noise source is sampled when one, but not both, of the digitized random noise sources makes a transition. If the resulting random noise source is random, but biased toward either 0 or 1, the result can easily be turned into a non-biased sequence of 0's and 1's by using well-known methods, such as by sampling sequential pairs of bits and outputting a "0" or "1" only when a "10" or "01" have occurred, and ignoring "00" and "11" sequences.

In one embodiment, when the outputs of both generators 402a-b are correlated, then output e of circuit 400 is 0. When the outputs are not correlated, e is a sequence of random numbers, signifying a non-correlated result.

Checking correlation in circuit 400 is obtained by the logic circuitry including logic gates 404 and 406 and latch 408. Any other circuit that determines the correlation between two inputs can be used, as long as the circuit conforms to the principles of the invention. Circuit 400 has latch 408 being used as a memory element. Since only one memory element is present, correlation is performed on sequences of two bits. Other embodiment includes additional memory elements, where correlation between the outputs of TRNGs 402a and 402b can be tested for longer sequences.

The logic circuitry has basically three stages. The first stage compares the outputs of the two TRNGs. The second stage stores the value of the comparison in stage 1, and the third stage compares the current output of stage 1 with the previous value obtained in stage 1 (read from the output of stage 2). In the embodiment of FIG. 4, exclusive OR logic gate 404 performs the comparison of outputs a and b from TRNGs 402a and 402b. The result of the exclusive OR operation from logic gate 404 is stored in latch 408. Finally, the second exclusive OR gate compares the output c from gate 404 and d from latch 408. This in fact compares the current value of c with the previous value of c.

The logic circuitry in circuit 400 is just one embodiment to check for correlation. Other logic circuitry may be utilized to perform the three-stage functionality described above, as FIG. 4 is exemplary and not meant to be limiting. The logic circuitry may be based on other types of logic gates like AND, OR, NOT, NXOR, NAND, NOR, etc. Further, in another embodiment, values from the outputs of the TRNGs are stored in memory elements, as opposed to monitoring the relationship between the outputs.

Figure 5:
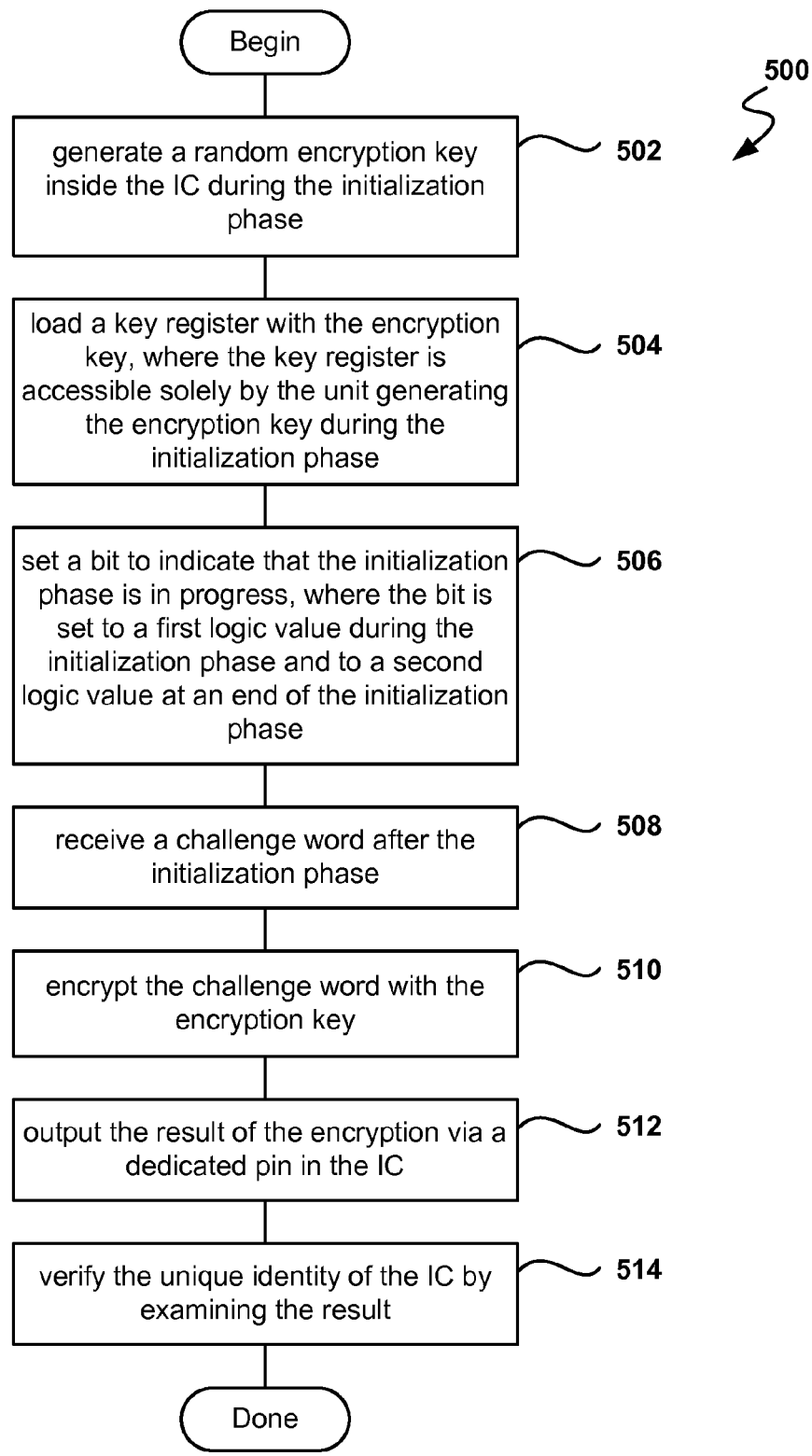
FIG. 5 shows the flow of an algorithm for verifying the unique identity of an integrated circuit, in accordance with one embodiment of the invention.

FIG. 5 shows the flow of method 500 for verifying the unique identity of an integrated circuit, in accordance with one embodiment of the invention. In operation 502, the method generates a random encryption key inside the IC during the initialization phase. In one embodiment, the random key is generated by the circuit of FIG. 3, and in another embodiment by the circuit of FIG. 4. It should be appreciated that other RNG's may be used as FIGS. 3 and 4 are exemplary and not meant to be limiting.

A key register is loaded with the encryption key during the initialization phase in operation 504. The key register is accessible solely by the unit generating the encryption key during the initialization phase to avoid malicious activity that would load a known key into the key register. In operation 506, the method sets a bit to indicate that the initialization phase is in progress. The bit is set to a first logic value during the initialization phase and to a second logic value at an end of the initialization phase. In one embodiment, the bit is stored in memory element 230 of FIG. 2.

After the initialization phase, a challenge word is received in operation 508, and the challenge word is encrypted using the encryption key in operation 510. In operation 512, the challenge word is encrypted using the encryption key, and the result of the encryption is output via a dedicated pin (such as pin 206 of FIG. 2) in operation 512. In operation 514, the unique identity of the IC is verified by examining the result of the encryption. The user verifying the ID of the IC separately calculates a value resulting from encrypting the challenge phrase with the known key of the IC. If the value calculated is equal to the response received from the IC, then the IC is verified as unique and having the unique digital fingerprint.

The methods and circuits, for verifying a unique identity of an integrated circuit, described herein may be incorporated into any suitable integrated circuit. For example, the method and system may be incorporated into other types of programmable logic devices such as programmable array logic (PAL), programmable logic array (PLA), field-programmable gate array (FPGA), field programmable logic array (FPLA), electrically programmable logic devices (EPLD), electrically erasable programmable logic device (EEPLD), logic cell array (LCA), just to name a few. The programmable logic device may be a part of a data processing system that includes one or more of the following components: a processor, memory; I/O circuitry, and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A circuit for verifying a unique identity of an integrated circuit (IC), the circuit comprising:
    a random number generator (RNG) circuit;
    a key register that stores an encryption key, the encryption key being created by the RNG circuit during a power-on or user-applied signal initialization phase, wherein a multiplexor enables reading of the key register when a security bit is cleared;
    an encryption circuit that generates a response based on a challenge key and the encryption key; and
    selection circuitry that selectively outputs the encryption key or the response from the encryption circuit, wherein the encryption key is being output from the IC through the selection circuitry during the initialization phase, and wherein the response is being output from the IC through the selection circuitry after the initialization phase, and wherein the response is used to determine the unique identity of the IC.

2. The circuit of claim 1, wherein the key register is readable during the initialization phase through a pin, wherein the key register is accessible solely by the encryption circuit after the initialization phase, and wherein the key register is a non-volatile register.

3. The circuit of claim 1, wherein a connection from the RNG circuit to the key register is isolated from other elements in the IC when the key register is being loaded with the encryption key generated by the RNG circuit.

4. The circuit of claim 1, wherein the selection circuitry further includes:
    a one-time programmable memory holding a security bit, the security bit having a first logic value during the initialization phase and a second logic value after the initialization phase; and
    a multiplexer coupled to the one-time programmable memory, wherein the multiplexer selects the key register when the security bit has the first logic value, and wherein the multiplexer selects the response when the security bit has the second logic value.

5. The circuit of claim 4, wherein the selection circuitry further includes a clear input coupled to the one-time programmable memory and to the key register, wherein the key register is reloaded and the one-time programmable memory is loaded with the first logical value based on the clear input, and wherein the clear signal is used to re-enter the initialization phase.

6. The circuit of claim 4, wherein the one-time programmable memory is selected from a group consisting of a non-volatile memory, a battery-backed memory, or a polyfuse.

7. The circuit of claim 1, wherein the circuit is located inside the IC.

8. The circuit of claim 1, wherein the random number generator circuit includes a resistor, and wherein the random number is generated based on shot-noise across the resistor.

9. A circuit for verifying a unique identity of an integrated circuit (IC), the circuit comprising:

two paired random number generator (RNG) circuits located proximate to each other on the IC;

an identification (ID) register that stores an IC ID, wherein the IC ID is loaded from one of the RNG circuits during an initialization phase when a sequence of bits from the one of the RNG circuits is random; and a dedicated input/output (I/O) pin that outputs a content of the ID register from the IC, the output content of the ID register comprising the IC ID loaded from one of the RNG circuits during the initialization phase, wherein the I/O pin is an exclusive pin to access the content of the ID register, and wherein the I/O pin is inaccessible to other elements of the IC besides the ID register.

10. The circuit of claim 9, wherein the I/O pin supports the Joint Test Action Group (JTAG) standard.

11. The circuit of claim 9, wherein the ID register has one of 128 bits or 256 bits.

12. The circuit of claim 9, wherein the ID register can be reloaded during a power-on sequence or after receiving a load signal.

13. The circuit of claim 9, wherein the ID register is one of a polyfuse or a battery-backed memory.

14. A method for verifying a unique identity of an integrated circuit (IC), the method comprising:

generating an encryption key during an initialization phase by combining outputs of two paired True Random Number Generator (TRNG) circuits, wherein the encryption key generated randomly inside the IC;

loading a key register with the encryption key, wherein the key register is accessible solely by an encryption key generator during the initialization phase;

setting a bit to a first logic value during the initialization phase and to a second logic value at an end of the initialization phase;

outputting the encryption key from the IC;

receiving a challenge word after the initialization phase;

encrypting the challenge word with the encryption key;

outputting a result of the encrypting from the IC via a dedicated pin in the IC; and subsequent to said outputting, verifying the unique identity of the IC by examining the result output from the IC, wherein the encryption key output from the IC is utilized in the verifying of the unique identity of the IC.

15. The method of claim 14, wherein the dedicated pin outputs the encryption key from the IC when the bit contains the first logic value and wherein the dedicated pin outputs the results of the encrypting when the bit contains the second logic value.

16. The method of claim 14, further including setting a clear signal to restart the initialization phase and generate a new encryption key.

17. The method of claim 14, wherein the key register is accessible solely through the dedicated pin.

18. The method of claim 14, wherein the encrypting is performed using Advanced Encryption Standard (AES) encryption.

19. The method of claim 14, wherein the challenge is generated outside the IC.

20. The method of claim 14, wherein generating the encryption key randomly includes:

checking for correlation between the outputs of the TRNGs;

outputting the result of the combination when the check indicates no correlation; and outputting an error signal when the check indicates a correlation.

21. The circuit of claim 1, wherein the circuit is configured for receiving the challenge key from a component external to the IC.

* * * * *